(12) United States Patent
Hasegawa

(10) Patent No.: US 6,275,238 B1
(45) Date of Patent: Aug. 14, 2001

(54) PATH COMPRESSION SYSTEM FOR COMPRESSING PATH IN GRAPH INFORMATION AND PATH COMPRESSION METHOD THEREOF

(75) Inventor: Takumi Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/234,110

(22) Filed: Jan. 19, 1999

(30) Foreign Application Priority Data

Jan. 19, 1998 (JP) .................................................. 10-021386

(51) Int. Cl.[7] .............................. G06T 9/40; G06T 11/20
(52) U.S. Cl. ........................ 345/440; 345/441; 345/442
(58) Field of Search .......................... 345/134, 440–442; 707/3, 101, 204, 200; 709/245, 238; 370/392, 401, 351, 389; 375/240.12

(56) References Cited

U.S. PATENT DOCUMENTS

| 5,276,868 | * | 1/1994 | Poole ........................................ 707/3 |
| 6,011,795 | * | 1/2000 | Varghese et al. ..................... 370/392 |
| 6,014,659 | * | 1/2000 | Wilkinson, III et al. ................ 707/3 |
| 6,092,071 | * | 7/2000 | Bolan et al. .......................... 707/101 |
| 6,100,931 | * | 8/2000 | Mihara ............................. 375/240.12 |

FOREIGN PATENT DOCUMENTS

| 62-78681 | 4/1987 | (JP) . |
| 62-202268 | 9/1987 | (JP) . |
| 63-66675 | 3/1988 | (JP) . |
| 1-291378 | 11/1989 | (JP) . |
| 4-324577 | 11/1992 | (JP) . |
| 5-35809 | 2/1993 | (JP) . |
| 5-108740 | 4/1993 | (JP) . |
| 5-274392 | 10/1993 | (JP) . |

OTHER PUBLICATIONS

Hasegawa et al., "Method for Increasing Speed of Timing Analysis System Heart (1) to Large Scale Circuit", 5th National Conference of Information Processing Society of Japan 7F6, Sep. 28, 1987, pp. 2275–2278.
"Delay Time Analysis System—NELTAS 2", Information Processing Society of Japan, Design Automation 14–3, Oct. 29, 1982, pp. 1–8.

* cited by examiner

Primary Examiner—Jeffery Brier
Assistant Examiner—Thu-Thao Havan
(74) Attorney, Agent, or Firm—Sughrue, Mion, Zinn, Macpeak & Seas, PLLC

(57) ABSTRACT

According to the present invention, the path information of the graph information can be satisfactorily compressed even if any graph information is stored in a graph information storing means. The graph information storing means stores graph information therein. A linear type path compression means compresses a linear type path information in the graph information. An entry type path compression means compresses an entry type path information in the graph information. A branch type path compression means compresses a branch type path information in the graph information. A multi-path type path compression means compresses a multi-path type path information in the graph information. Across type pathcompression means compresses a cross type path information in the graph information. A compression control means applies all of the linear type path compression means, the entry type path compression means, the branch type path compression means, the multi-path type path compression means and the cross type path compression means to the graph information stored in the graph information storing means to compress the path information.

20 Claims, 15 Drawing Sheets

FIG.13
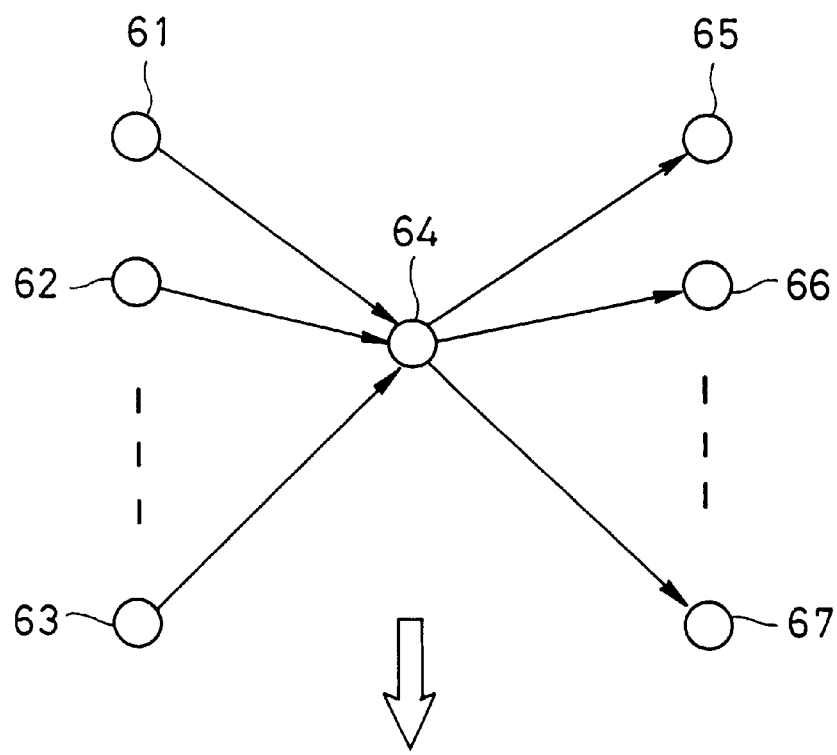
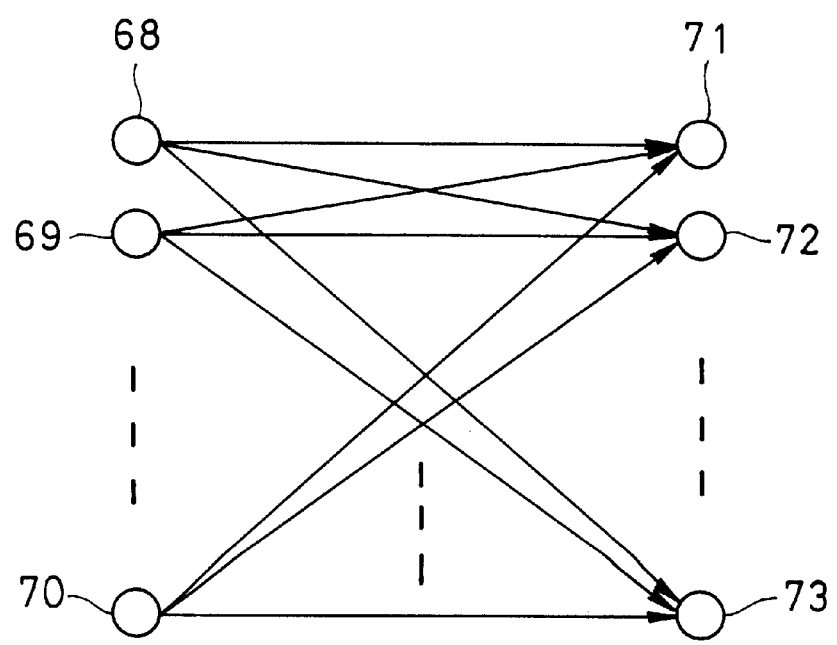

O : NODE  ⟶ : ARC

FIG.16

NODE TABLE

| NUMBER | INPUT DIRECTION ARC | OUTPUT DIRECTION ARC | ADDED DELAY TIME | NAME OF PIN |
|---|---|---|---|---|
| 1 | 0 | 1 | 1 | |
| 2 | 1 | 2 | 0 | |
| 3 | 2 | 3 | 0 | |
| 4 | 3 | 4 | 0 | |
| 5 | 4 | 5 | 0 | |
| 6 | 5 | 0 | 1 | (OMISSION) |
| 7 | 6 | 7 | 0 | |
| 8 | 7 | 8 | 0.5 | |
| 9 | 8 | 0 | 0 | |
| 10 | 9 | 10 | 0 | |
| 11 | 10 | 11 | 0.5 | |
| 12 | 11 | 0 | | |

ARC TABLE

| NUMBER | INPUT DIRECTION NODE | OUTPUT DIRECTION NODE | ARC OF THE SAME INPUT NODE | ARC OF THE SAME OUTPUT NODE | DELAY TIME | DELAY TIME OF ELEMENT | NAME OF ELEMENT | NAME OF WIRING |
|---|---|---|---|---|---|---|---|---|
| 1 | 1 | 2 | 0 | 0 | 1 | 1 | (1) | (9) |
| 2 | 2 | 3 | 0 | 0 | 1 | 0 | (2) | |
| 3 | 3 | 4 | 6 | 0 | 2 | 0 | (3) | (10) |
| 4 | 4 | 5 | 0 | 0 | 2 | 1 | (4) | |
| 5 | 5 | 6 | 9 | 0 | 1 | 0 | (5) | (11) |
| 6 | 3 | 7 | 0 | 0 | 0.5 | 0.5 | (6) | (10) |
| 7 | 7 | 8 | 0 | 0 | 0.5 | 0 | (7) | (12) |
| 8 | 8 | 9 | 0 | 0 | 1 | 0.5 | (8) | (10) |
| 9 | 3 | 10 | 0 | 0 | 0.3 | 0 | | |
| 10 | 10 | 11 | 0 | 0 | 0.3 | 0.5 | | (13) |
| 11 | 11 | 12 | 0 | 0 | | | | |

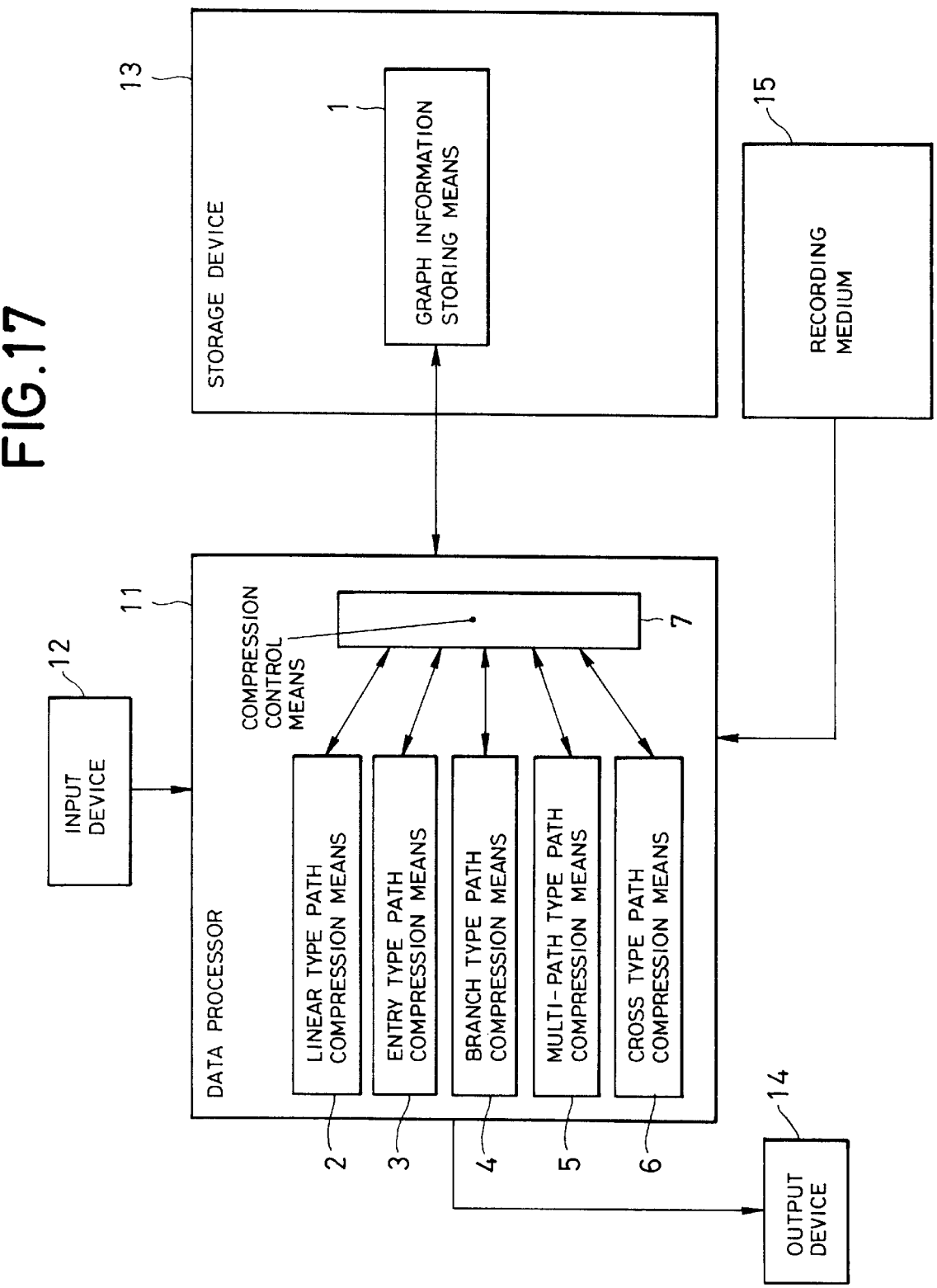

PATH COMPRESSION SYSTEM FOR COMPRESSING PATH IN GRAPH INFORMATION AND PATH COMPRESSION METHOD THEREOF

BACKGROUND OF THE INVENTION

1. Field of the Invention

The present invention relates to a path compression system for compressing paths in graph information and a path compression method thereof and more particularly to a path compression system for compressing paths included in data (called graph information, hereinafter) having such a graphic structure as a logic circuit and a path compression method thereof.

2. Description of the Prior Art

According to conventional path compression systems, it has been necessary to hold the halfway result of a search on the way of a path upon search of the path. In case the halfway result is obtained by a computer, the large capacity of a memory has been needed. In prior art documents of the above-described types of compression systems is included "Method for Increasing Speed of Timing Analysis System HEART (1) to Large Scale Circuit" (a Fifth National Conference of Information Processing Society of Japan 7F-6) (referred to as a prior art document 1, hereinafter).

Further, a path compression system has been known in which the halfway result of a search is not held during the search of the path. In this case, however, much processing time has been required. As prior art documents of this kind of compression system is included "Delay Time Analysis System-NELTAS 2-" (Information Processing Society of Japan, Design Automation Seminar Document, Design Automation 14-3, 1982) (referred to as a prior art document 2, hereinafter).

Furthermore, in attempting to reduce the capacity of a memory, a path compression system for compressing data has been known, however, the 1 conventional compression system of this kind has not performed a sufficient compression ratio. As prior arts of this kind of compression system is incorporated Japanese Unexamined Patent Publication No. Shouwa 62-202268 (referred to as a prior art document 3, hereinafter).

As described above, in the case of a technique disclosed in the prior art document 1 in the conventional path compression systems mentioned above, the halfway result of a search must be held during the search of the path. Therefore, if the halfway result is obtained on a computer, a large capacity of a memory will be undesirably needed.

Further, in the case of a technique disclosed in the prior art document 2, there has been disadvantageously a problem that much processing time is taken.

Furthermore, in the case of a technique disclosed in the prior art document 3, there has arisen an inconvenience that a compression cannot be completed even when data is compressed in order to reduce the capacity of a memory.

SUMMARY OF THE INVENTION

Accordingly, it is a principal object of the present invention to overcome the disadvantages of the prior art systems. More specifically, an object of the present invention is the provision of a path compression system and a path compression method thereof in which the paths of graph information can be completely compressed even if any graph information is stored in a graph information storing means.

A path compression system according to the present invention comprises:

a graph information storing means for storing graph information;

a linear type path compression means for compressing a linear type path information in the graph information;

an entry type path compression means for compressing an entry type path information in the graph information;

a branch type path compression means for compressing a branch type path information in the graph information;

a multi-path type path compression means for compressing a multi-path type path information in the graph information;

a cross type path compression means for compressing a cross type path in the graph information; and a compression control means for entirely applying the linear type path compression means, the entry type path compression means, the branch type path compression means, the multi-path type path compression means and the cross type path compression means to the graph information stored in the graph information storing means to compress the path information.

The compression control means comprises:

a means for deciding whether or not there is no compression effect even when any of the linear type path compression means, the entry type path compression means, said the branch type path compression means, the multi-path type path compression means and the cross type path compression means are applied to a noticed node in the graph information; and a means for calling respectively the linear type path compression means, the entry path type compression means, the branch type path compression means, the multi-path type path compression means and the cross type path compression means for the noticed node when the compression effect is attained and performing respective compression control processes therefor; and a means for making all nodes as the noticed node.

The linear type path compression means comprises:

a means for deciding whether or not the number of arcs in the input direction of the noticed node is one and the number of arcs in the output direction is one;

a means for accumulating the additional delay time of the noticed node, the delay time of the arc in the output direction, the delay time of the element of the arc in the input direction and the delay time of the arc in the input direction to have the newly delay time of the arc in the input direction, when the decided result is "YES;"

a means for regarding the delay time of the element of the arc in the output direction as the delay time of the element of the arc in the input direction;

a means for changing the output side connection of the arc in the input direction to the output side node of the arc in the output direction from the noticed node; and a means for deleting the noticed node and the arc in the output direction.

The entry type path compression means comprises:

a means for deciding whether or not the number of arcs in the input direction of the noticed node is two or more and the number of arcs in the output direction is one;

a means for accumulating the additional delay time of the noticed node, the delay time of the arc in the output direction, the delay time of the elements of the arcs in the input direction of the noticed node and the delay time of the respective arcs in the input direction to have the delay times of the elements of the respective arcs in the input direction when the decided result is "YES;"

a means for regarding the delay time of the element of the arc in the output direction as the delay time of the elements of the respective arcs in the input direction;

a means for changing the output side connections of respective nodes in the input direction to the output side node of the arc in the output direction from the noticed node; and a means for deleting the noticed node and the arc in the output direction.

The branch type path compression means comprises:

a means for deciding whether or not the number of arcs in the input direction of the noticed node is one and whether or not the number of arcs in the output direction is two or more;

a means for accumulating the additional delay time of the noticed node, the delay time of the arc in the input direction, the delay time of the element of the arc in the input direction and the delay time of the respective arcs in the output direction to have the delay times of the respective arcs in the output direction when the decided result is "YES;"

a means for changing the input side connections of nodes in the output direction to the input side node of the arc in the input direction from the noticed node; and a means for deleting the noticed node and the node in the input direction.

The multi-path type path compression means comprises:

a means for deciding whether or not there exist the same combinations of input side nodes and output side nodes in all the arcs in the input direction of the noticed node; and a means for deleting all other arcs except an arc the sum of its delay time and the delay time of the element of which is maximum among arcs to be processed when the decided result is "YES."

The cross type path compression means comprises:

a means for deciding whether or not the number of arcs in the input direction of the noticed node is two or more and the number of arcs in the output direction is two;

a means for paying attention respectively to the combinations of the arcs in the input direction and in the output direction and forming arcs for connecting the input side nodes of the arcs in the input direction to the output side nodes of the arcs in the output direction when the decided result is "YES;" a means for accumulating the additional delay time of the noticed node, the delay time of the arcs in the input direction, the delay time of the elements of the arcs in the input direction and the delay time of the arcs in the output direction to have the delay time of new arcs;-and a means for deleting the processed arcs and the noticed node.

A path compression system according to the present invention comprises:

a graph information storing means for storing graph information;

a linear type path compression means for compressing a linear type path information in the graph information;

an entry type path compression means for compressing an entry type path information in the graph information;

a branch type path compression means for compressing a branch type path in the graph information;

a multi-path type path compression means for compressing a multi-path type path information in the graph information;

a cross type path compression means for compressing a cross type path information in the graph information; and a compression control means for selecting the path information to be compressed from the linear type path, the entry type path, the branch type path, the multi-path type path and the cross type path based on the graph information stored in the graph information storing means, selectively applying the linear type path compression means, the entry type path compression means, the branch type path compression means, the multi-path type path compression means and the cross type path compression means.

A path compression method according to the present invention comprises:

a graph information storing step for storing graph information;

a linear type path compression step for compressing a linear type path information in the graph information;

an entry type path compression step for compressing an entry type path information in the graph information;

a branch type path compression step for compressing a ranch type path information in the graph information;

a multi-path type path compression step for compressing a multi-path type path information in the graph information;

a cross type path compression step for compressing a cross type path information in the graph information; and a compression control step for entirely applying the linear type path compression step, the entry type path compression step, the branch type path compression step, the multi-path type path compression step and the cross type path compression step to the graph information stored in the graph information storing step to compress the path information.

The compression control step comprises:

a step for deciding whether or not there is no compression effect even when any of the linear type path compression step, the entry type path compression step, the branch type path compression step, the multi-path type path compression step and the cross type path compression step are applied to a noticed node in the graph information; and a step for calling respectively the linear type path compression step, the entry path type compression step, the branch type path compression step, the multi-path type path compression step and the cross type path compression step for the noticed node when the compression effect is attained and performing respective compression control processes therefor; and a step for making all nodes as the noticed node.

The linear type path compression step comprises:

a step for deciding whether or not the number of arcs in the input direction of the noticed node is one and the number of arcs in the output direction is one;

a step for accumulating the additional delay time of the noticed node, the delay time of the arc in the output direction, the delay time of the element of the arc in the input direction and the delay time of the arc in the input direction to have the newly delay time of the arc in the input direction when the decided result is "YES;"

a step for regarding the delay time of the element of the arc in the output direction as the delay time of the element of the arc in the input direction;

a step for changing the output side connection of the arc in the input direction to the output side node of the arc in the output direction from the noticed node; and a step for deleting the noticed node and the arc in the output direction.

The entry type path compression step comprises:

a step for deciding whether or not the number of arcs in the input direction of the noticed node is two or more and the number of arcs in the output direction is one;

a step for accumulating the additional delay time of the noticed node, the delay time of the arc in the output direction, the delay time of the elements of the arcs in the input direction of the noticed node and the delay time of the respective arcs in the input direction to have the delay times of the elements of the respective arcs in the input direction when the decided result is "YES;"

a step for regarding the delay time of the element of the arc in the output direction as the delay time of the elements of the respective arcs in the input direction;

a step for changing the output side connections of respective nodes in the input direction to the output side node of the arc in the output direction from the noticed node; and a step for deleting the noticed node and the arc in the output direction.

The branch type path compression step comprises:

a step for deciding whether or not the number of arcs in the input direction of the noticed node is one and the number of arcs in the output direction is two or more;

a step for accumulating the additional delay time of the noticed node, the delay time of the arc in the input direction, the delay time of the element of the arc in the input direction and the delay time of the respective arcs in the output direction to have the delay times of the respective arcs in the output direction when the decided result is "YES;"

a step for changing the input side connections of nodes in the output direction to the input side node of the arc in the input direction from the noticed node; and a step for deleting the noticed node and the node in the input direction.

The multi-path type path compression step comprises:

a step for deciding whether or not there exist the same combinations of input side nodes and output side nodes in all the arcs in the input direction of the noticed node; and a step for deleting all other arcs except an arc the sum of its delay time and the delay time of the element of which is maximum among the arcs to be processed when the decided result is "YES."

The cross type path compression step comprises:

a step for deciding whether or not the number of arcs in the input direction of the noticed node is two or more and the number of arcs in the output direction is two;

a step for paying attention respectively to the combinations of the arcs in the input direction and in the output direction and forming arcs for connecting the input side nodes of the arcs in the input direction to the output side nodes of the arcs in the output direction when the decided result is "YES;"

a step for accumulating the additional delay time of noticed node, the delay time of the arcs in the input direction, the delay time of the elements of the arcs in the input direction and the delay time of the arcs in the output direction to have the delay time of new arcs; and a step for deleting the processed arcs and the noticed node.

A path compression method comprises:

a graph information storing step for storing graph information;

a linear type path compression step for compressing a linear type path information in the graph information;

an entry type path compression step for compressing an entry type path information in the graph information;

a branch type path compression step for compressing a branch type path information in the graph information;

a multi-path type path compression step for compressing a multi-path type path information in the graph information;

a cross type path compression step for compressing a cross type path information in the graph information; and a compression control step for selecting the path information to be compressed from the linear type path, the entry type path, the branch type path, the multi-path type path and the cross type path based on the graph information stored in the graph information storing step, selectively applying the linear type path compression step, the entry type path compression step, the branch type path compression step, the multi-path type path compression step and the cross type path compression step.

The present invention by means of which these objects are attained will be described with reference to the accompanying drawings.

BRIEF DESCRIPTION OF THE DRAWINGS

FIG. 13 is an explanatory view for explaining the compression of a path by the cross type path compression means shown in FIG. 1;

FIG. 16 illustrates a node table and an arc table for storing the graph information of the graph shown in FIG. 15; and FIG. 17 is a block diagram showing the construction of a path compression system according to a second embodiment of the present invention.

DETAILED DESCRIPTION OF THE PREFERRED EMBODIMENTS

Figure 1:
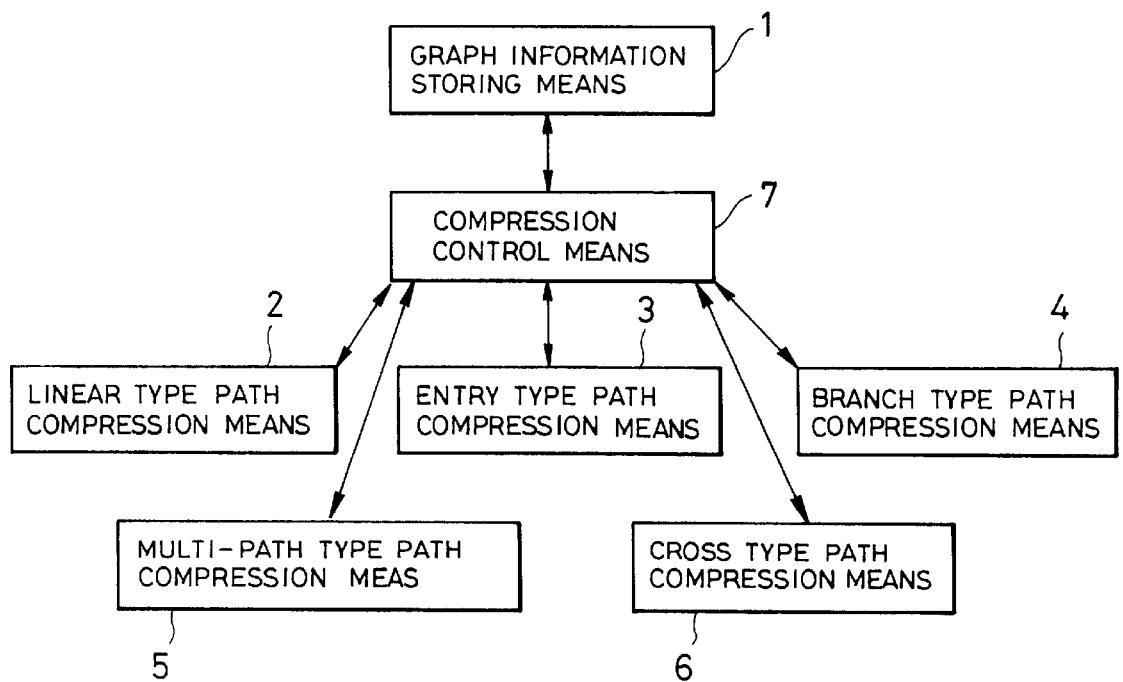
FIG. 1 is a block diagram showing a construction of a path compression system according to a first embodiment of the present invention.

Referring now to the drawings, embodiments of the present invention will be described in more detail hereinbelow.

In FIG. 1, there is shown a block diagram for illustrating the construction of a path compression system according to a first embodiment of the present invention. The path compression system of the first embodiment comprises a graph information storing means 1 for storing graph information composed of nodes and arcs, a linear type path compression means 2 for compressing a linear type path information, an entry type path compression means 3 for compressing an entry type path information, a branch type path compression means 4 for compressing a branch type path information, a multi-path type path compression means 5 for compressing a multi-path type path information, a cross type path compression means 6 for compressing a cross type path information, and a compression control means 7 for controlling the application of the linear type path compression means 2, the entry type path compression means 3, the branch type path compression means 4, the multi-path type path compression means 5 and the cross type path compression means 6.

Figure 14:
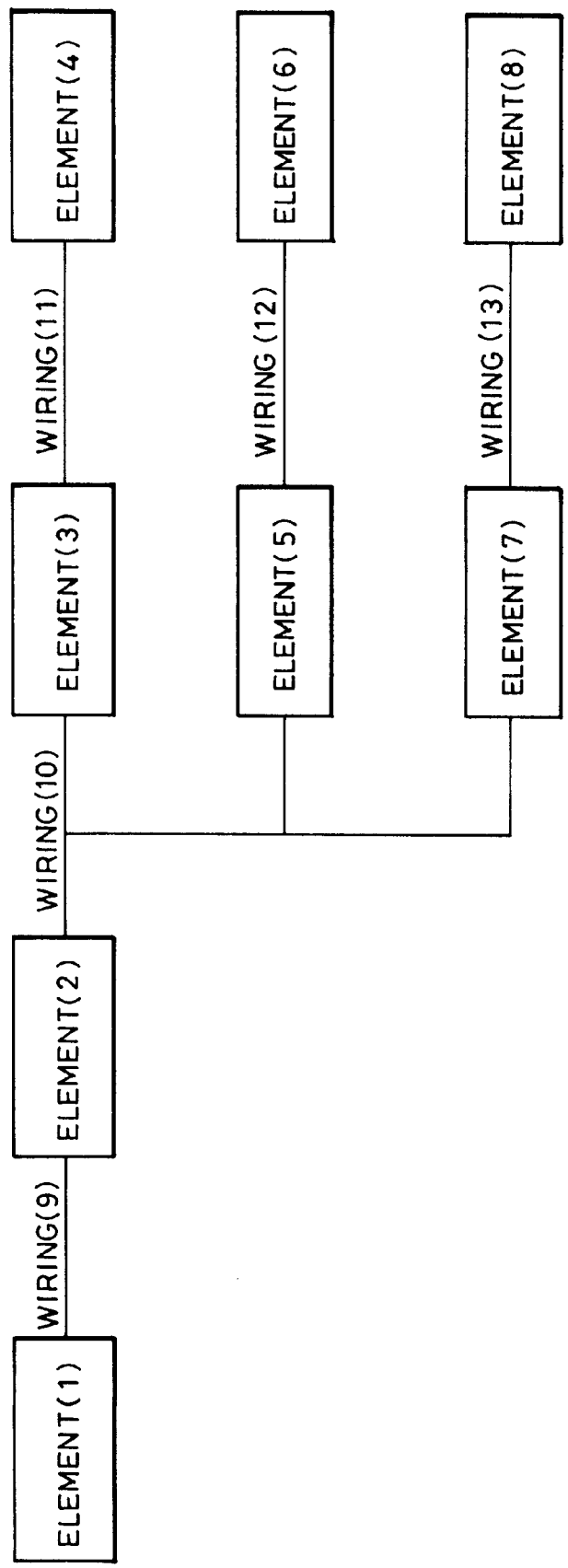
FIG. 14 is a view showing an example of a logic circuit from which graph information stored in a graph information storing means shown in FIG. 1 is originated.
Figure 15:
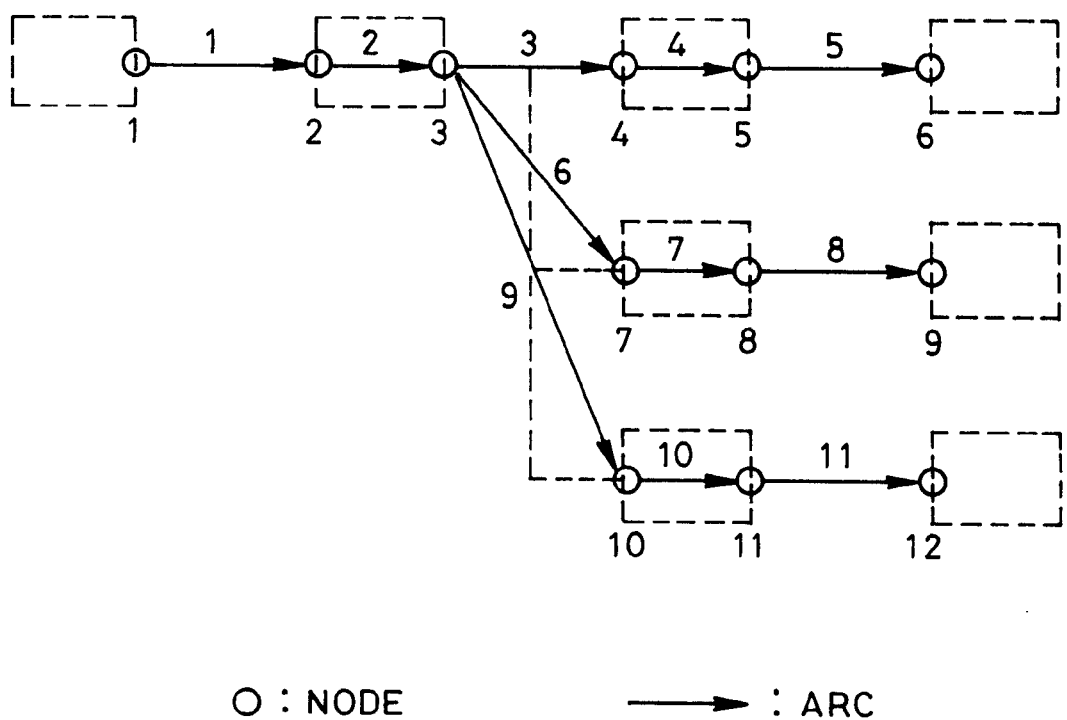
FIG. 15 is a view for illustrating a graph generated from the logic circuit shown in FIG. 14.

The graph information storing means 1 stores directed graph information to be searched therein. For instance, in the case of a logic circuit shown in FIG. 14, a graph comprising nodes and arcs as illustrated in FIG. 15 is obtained. The graph information of such a graph is stored in, for example, a node table and an arc table as shown in FIG. 16. Each entry of the node table comprises respective fields of number, input direction arc, output direction arc, additional delay time and the name of pin. Further, each entry of the arc table comprises respective fields of number, input direction node, output direction node, the arc of the same input node, the arc of the same output node, delay time, the delay time of an element, the name of an element and the name of a wiring. In this case, all of the five path compression means including the linear type path compression means 2, the entry type path compression means 3, the branch type path compression means 4, the multi-path type path compression means 5 and the cross type path compression means 6 are not always applied to the graph information illustrated in FIG. 16.

Figure 2:
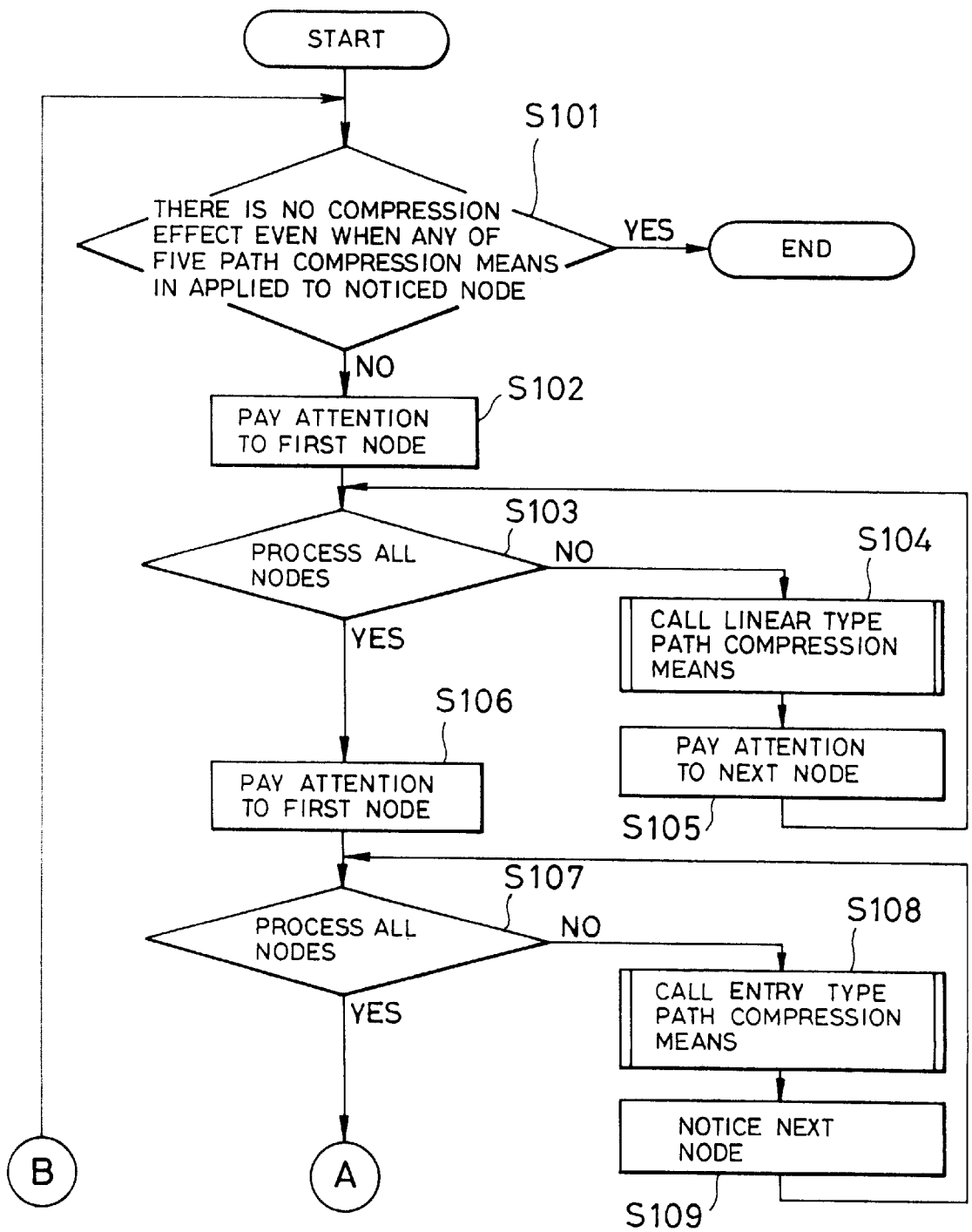
FIG. 2 is a flowchart showing the first half part of a process of a compression control means shown in FIG. 1.
Figure 3:
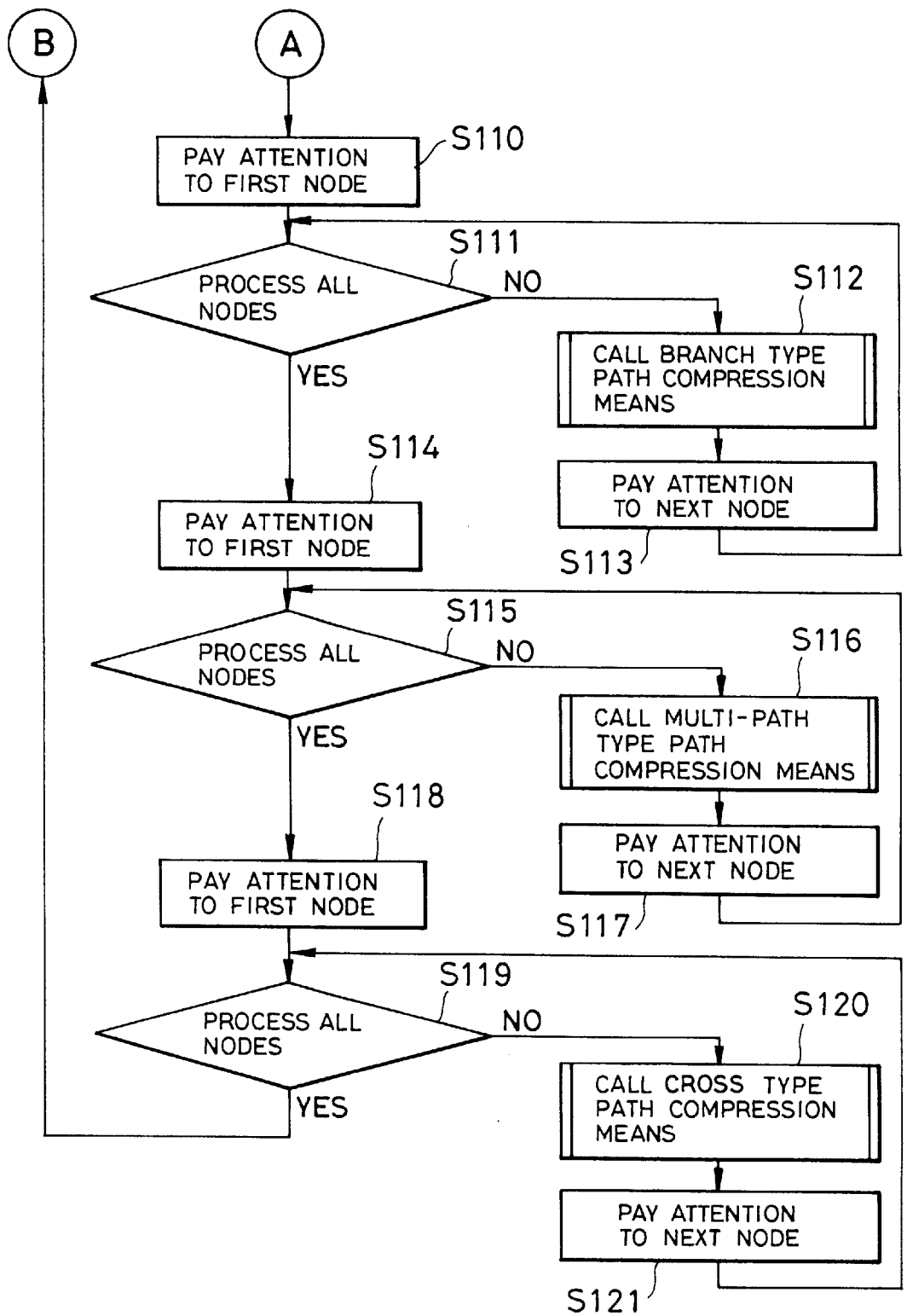
FIG. 3 is a flowchart showing the last half part of the process of the compression control means shown in FIG. 1.

Turning now to FIGS. 2 and 3, the process of the compression control means 7 comprises a step S101 for deciding whether or not the compression effect of all the path compression means is present, a step S102 for paying attention to a first node, a step S103 for deciding whether or not the processes of all nodes are completed, a step S104 for calling the linear type path compression means, a step S105 for noticing a next node, a step S106 for paying attention to a first node, a step S107 for deciding whether or not the processes of all the nodes are completed, a step S108 for calling the entry type path compression means, a step S109 for noticing a next node, a step S110 for noticing a first node, a step S111 for deciding whether or not all the nodes are completely processed, a step S112 for calling the branch type pathcompression means, a step S113 for paying attention to a next node, a step S114 for paying attention to a first node, a step S115 for deciding whether or not the processes of all nodes are completed, a step S116 for calling the multi-path type path compression means, a step S117 for noticing a next node, a step S118 for paying attention to a first node, a step S119 for deciding whether or not all the nodes are completely processed, a step S120 for calling the cross type path compression means and a step S121 for paying attention to a next node.

Figure 4:
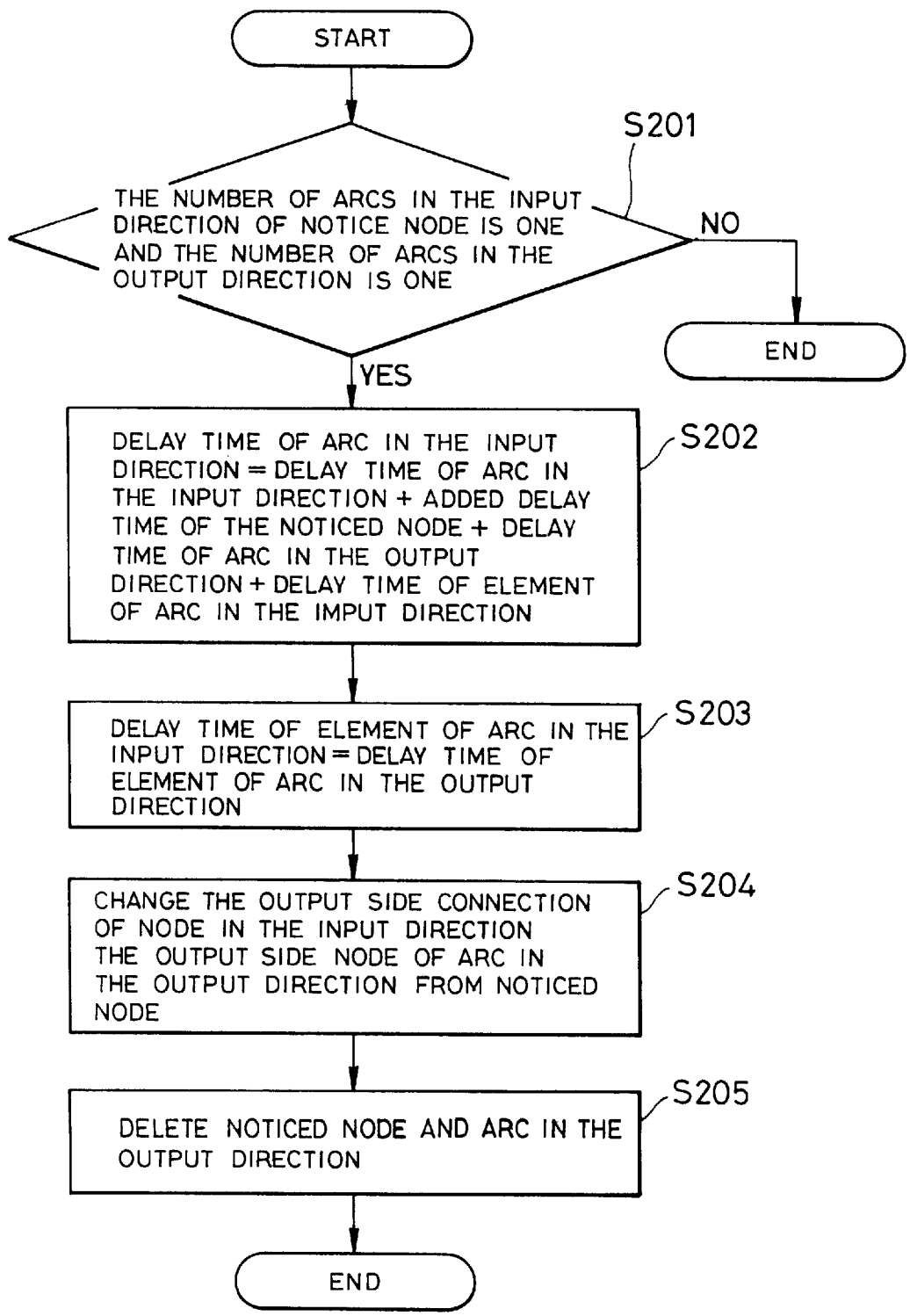
FIG. 4 is a flowchart showing the process of a linear type path compression means shown in FIG. 1.

Now, referring to FIG. 4, the process of the linear type path compression means 2 comprises a step S201 for deciding whether or not the number of arcs of a noticed node in an input direction is one and the number of arcs in an output direction is one, a step S202 for calculating the delay time of the arc in the input direction, a step S203 for setting the delay time of the element of the arc in the input direction, a step S204 for changing the connection of the node in the input direction and a step S205 for deleting the noticed node and the arc in the output direction.

Figure 5:
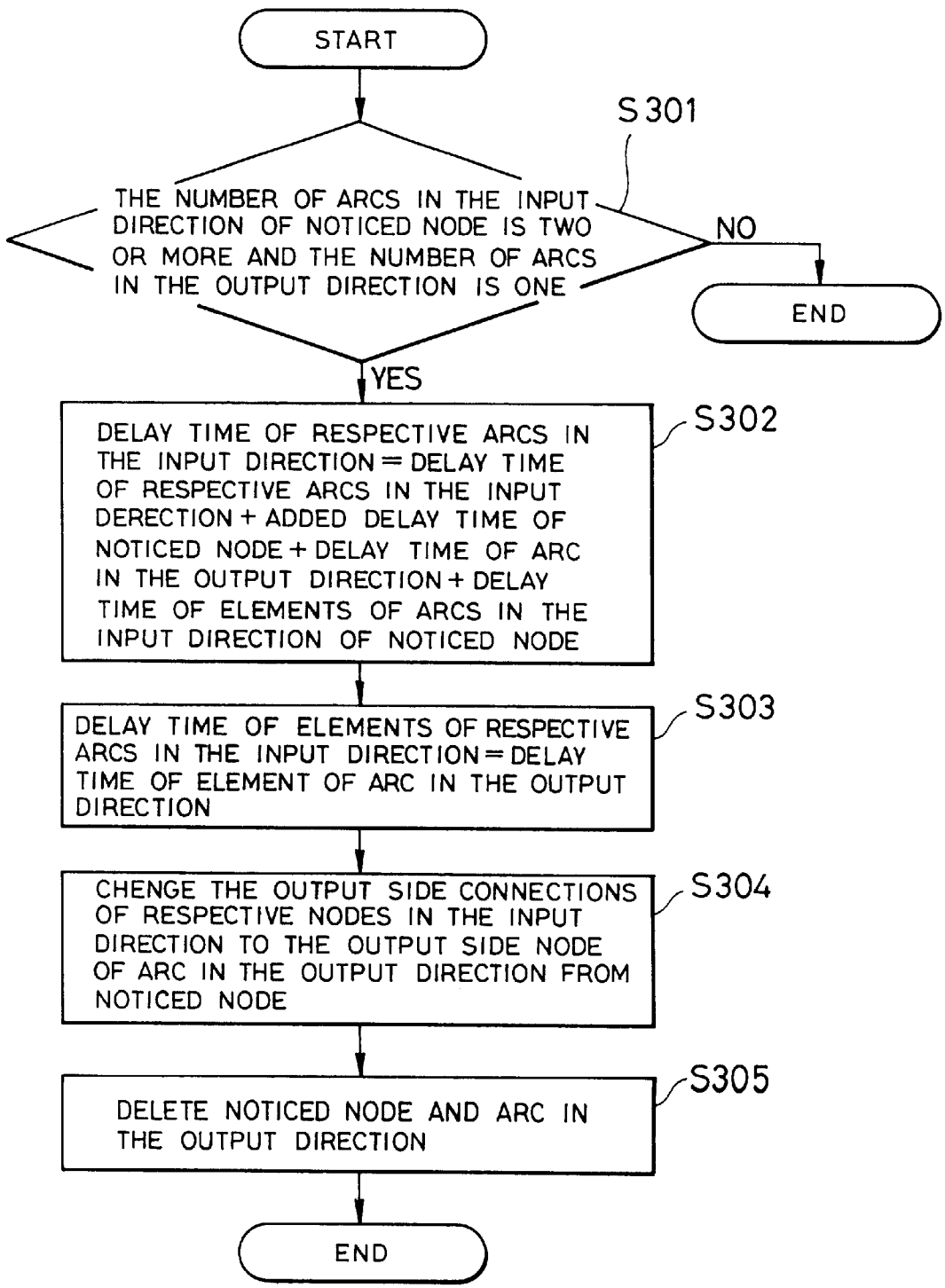
FIG. 5 is a flowchart showing the process of an entry type path compression means shown in FIG. 1.

Referring now to FIG. 5, the process of the entry type path compression means 3 comprises a step S301 for deciding whether or not the number of arcs in the input direction of a noticed node is not smaller than two and whether or not the number of arcs in an output direction is one, a step S302 for calculating the delay time of the arcs in respective input directions, a step S303 for setting the delay time of the elements of the arcs in the respective input directions, a step S304 for changing the connections of nodes in the respective input directions and a step S305 for deleting the noticed node and the arc in the output direction.

Figure 6:
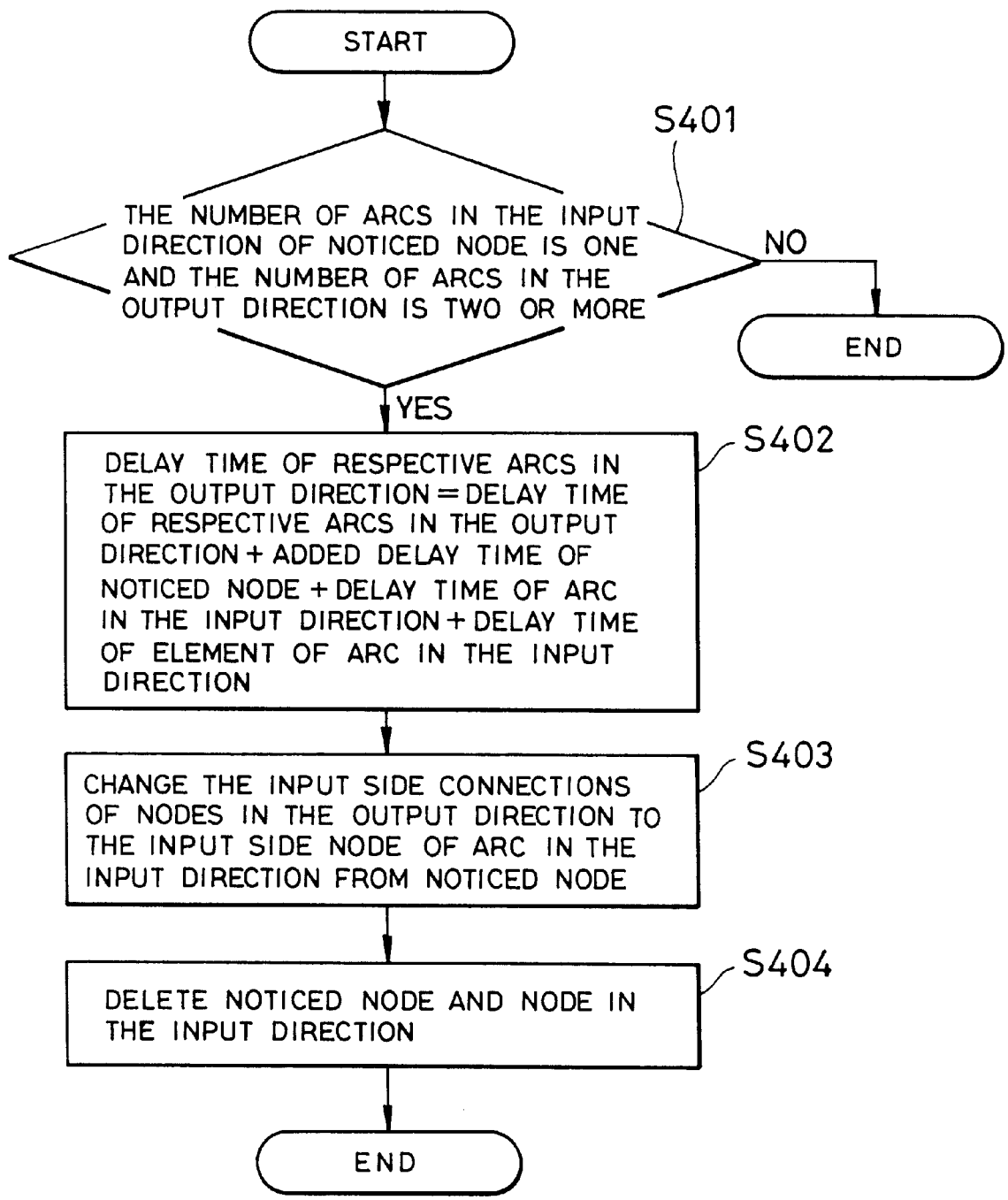
FIG. 6 is a flowchart showing the process of a branch type path compression means shown in FIG. 1.

Now, with reference to FIG. 6, the process of the branch type path compression means 4 comprises a step S401 for deciding whether or not the number of arcs in the input direction of a noticed node is one and the number of arcs in an output direction is two or more, a step S402 for calculating the delay time of the arcs in respective output directions, a step S403 for changing the connection of nodes in output directions and a step S404 for deleting the noticed node and nodes in input directions.

Figure 7:
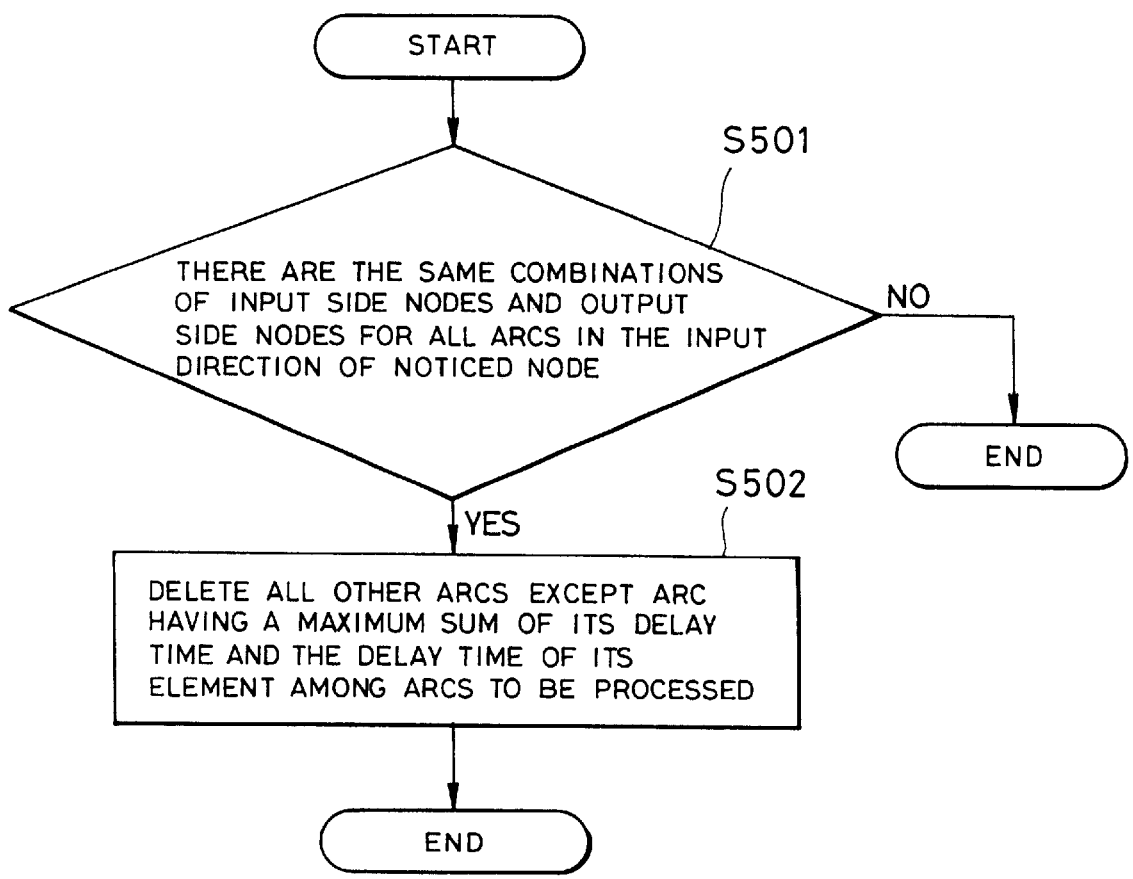
FIG. 7 is a flowchart showing the process of a multi-path type path compression means shown in FIG. 1.

As shown in FIG. 7, the process of the multi-path type path compression means 5 comprises a step S501 for deciding whether or not there exist arcs having the same combination of nodes in an input side with nodes in an output side and a step S502 for deleting arcs.

Figure 8:
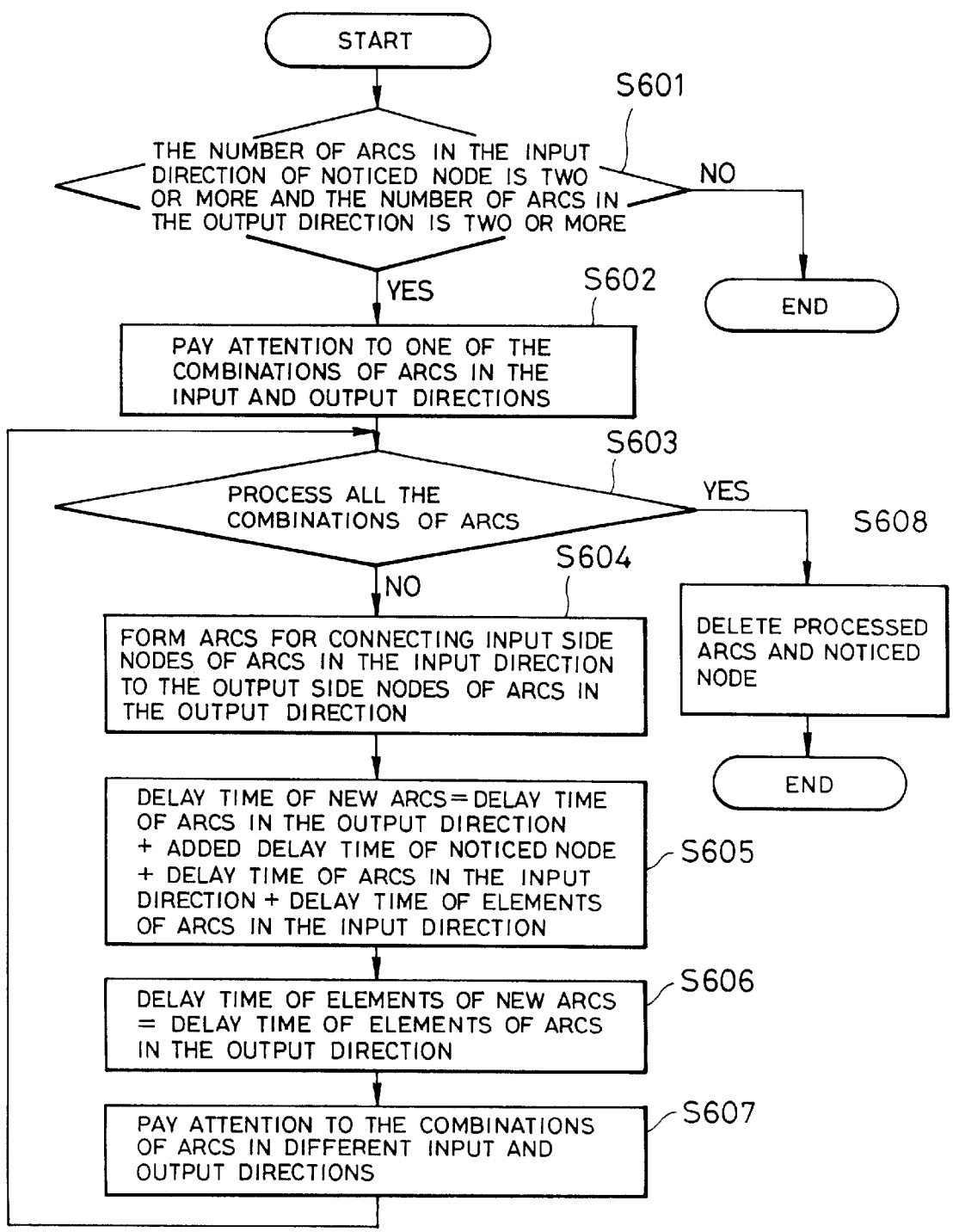
FIG. 8 is a flowchart showing the process of a cross type path compression means shown in FIG. 1.

Further, as shown in FIG. 8, the process of the cross type path compression means 6 comprises a step S601 for deciding whether or not the number of arcs in the input direction of a noticed node is not smaller than two and whether or not the number of arcs in an output direction is not smaller than two, a step S602 for paying attention to one of the combinations of the arcs in the output direction and the arcs in the input direction, a step S603 for deciding whether or not the processes of all the combinations of the arcs are completed, a step S604 for forming a node connected arc, a step S605 for calculating the delay time of a new arc, a step S606 for setting the delay time of the element of the new arc, a step S607 for paying attention to the combinations of arcs in different input directions with arcs in different output directions, and a step S608 for deleting the noticed arc and node.

In the next place, the operation of the path compression system according to the first embodiment constructed as mentioned above will be described below.

The compression control means 7 determines a path compression means to be employed subsequently based on the graph information stored in the graph information storing means 1 and compresses the path of the graph information by using it.

More specifically, the compression control means 7 decides in the step S101 whether or not the compression effect cannot be obtained for a node noticed in the graph information even when any of the five path compression means including the linear type path compression means 2, the entry type path compression means 3, the branch type path compression means 4, the multi-path type path compression means 5 and the cross type path compression means 6 is applied to the node. When the compression effect can be obtained, the compression control means 7 pays attention to the first node in the step S102. Then, the control means decides whether or not all the nodes are processed in the step S103. When the process of all the nodes are not completed, the compression control means 7 calls the linear type path compression means 2 in the step S104.

The linear type path compression means 2 decides in the step S201 whether or not the number of arcs in the input direction of the node to which the attention is paid is one and the number of arcs in the output direction of the node is one. When the number of arcs is not one, the path of the graph information is not a linear type path, so that the linear type path compression means 2 immediately finishes a process. When the number of arcs is one in the step S201, the path of the graph information is a linear type path, and therefore, the linear type path compression means 2 accumulates the additional delay time of the noticed node, the delay time of the arc in the output direction, the delay time of the element of the arc in the input direction and the delay time of the arc in the input direction to obtain the newly delay time of the arc in the input direction in the step S202.

Then, in the step S203, the linear type path compression means 2 sets the delay time of the element of the arc in the output direction to the delay time of the element of the arc in the input direction. In the step S204, the linear type path compression means changes the output side connection of the nodes in the input direction to the output side node of the arc in the output direction from the noticed node. Then, the linear type path compression means deletes the noticed node and the arc in the output direction in the step S205 to complete the process. As a result, the compression of the path information as shown in FIG. 9 is carried out.

Figure 9:
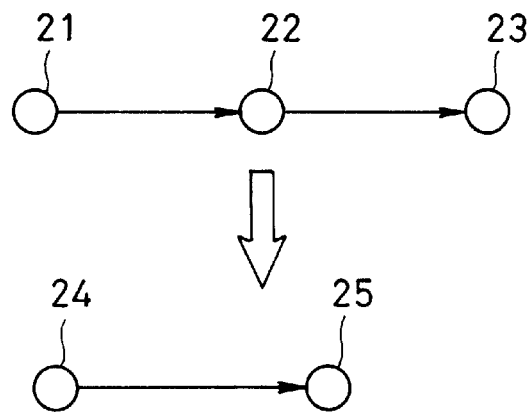
FIG. 9 is an explanatory view for explaining the compression of a path by the linear type path compression means shown in FIG. 1.

FIG. 9 is a diagram for explaining the compression of a path information by the linear type path compression means 2. A node 22 is deleted. A node 21 is changed to a node 24, and a node 23 is changed to a node 25.

The weight of an arc from the node 21 to the node 22 is added to the weight of an arc from the node 22 to the node 23 to form the weight of an arc from the node 24 to the node 25. When the control is returned to the compression control means 7 from the linear type path compression means 2, the compression control means 7 pays attention to the next node in the step S105, returns the control to the step S103 and repeats the steps S103 to S105.

In the step S103, when it is decided that all the nodes are processed, the compression control means 7 notices the first node in the step S106 to decide whether or not all the nodes are processed in the step S107. When the process of all the nodes are not completed, the compression control means 7 calls the entry type path compression means 3 in the step S108.

The entry type path compression means 3 decides whether or not the number of arcs in the input direction of the noticed node is two or more and the number of arcs in the output direction of the node is one in the step S301. When the number of arcs in the input direction is not two or more and the number of arcs in the output direction is not one, the path of the graph information is not an entry type path, so that the entry type path compression means 3 quickly finishes the process. When the number of arcs in the input direction is two or more and the number of arcs in the output direction is one in the step S301, the path of the graph information is an entry type path. Thus, in the step S302, the entry type path compression means 3 accumulates the additional delay time of the noticed node, the delay time of the arc in the output direction, the delay time of the elements of the arcs in the input direction of the noticed node and the delay time of the arcs respectively in the input direction of the node to thus obtain the delay times of the respective arcs in the input direction.

Then, in the step S303, the entry type path compression means 3 sets the delay time of the element of the arc in the output direction to the delay time of the elements of the respective arcs in the input direction. In the step S304, the entry type path compression means 3 changes the output side connection of respective nodes in the input direction to the output side node of the arc in the output direction from the noticed node and deletes the noticed node and the arc in the output direction in the step S305 to finish the process. Consequently, the path information is compressed as illustrated in FIG. 10.

Figure 10:
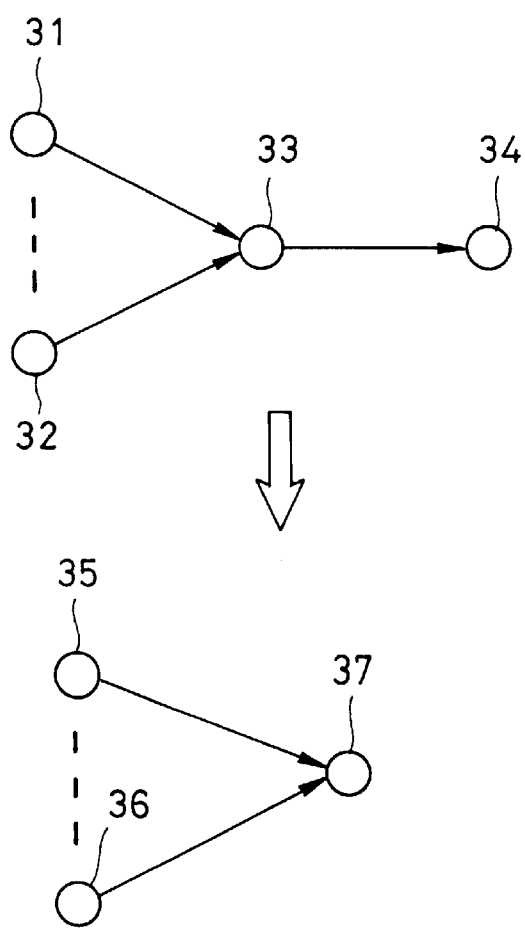
FIG. 10 is an explanatory view for explaining the compression of a path by the entry type path compression means shown in FIG. 1.

FIG. 10 is a diagram for explaining the compression of a path information by the entry type path compression means 3. In FIG. 10, a node 33 is deleted. A node 31 is changed to a node 35. A node 32 is changed to a node 36. A node 34 is changed to a node 37. The weight of an arc from the node 31 to the node 33 is added to the weight of an arc from the node 33 to the node 34 to form the weight of an arc from the node 35 to the node 37. The weight of an arc from the node 32 to the node 33 is added to the weight of an arc from the node 33 to the node 34 to have the weight of an arc from the node 36 to the node 37. Nodes between the node 31 and the node 32 are also compressed in the same manner.

When a control is returned to the compression control means 7 from the entry type path compression means 3, the compression control means 7 pays attention to the next node in the step S109 and returns the control to the step S107 to repeat the steps S107 to S109.

In the step S107, when it is decided that all the nodes are processed, the compression control means 7 notices the first node in the step S110 to decide whether or not all the nodes are processed in the step S111. When the process of all the nodes are not completed, the compression control means 7 calls the branch type path compression means 4 in the step S112.

The branch type path compression means 4 decides in the step S401 whether or not the number of arcs in the input direction of the noticed node is one and the number of arcs in the output direction is two or more. When the number of arcs in the input direction of the noticed node is not one and the number of arcs in the output direction is not two or more, the path of the graph information is not a branch type path, hence, the branch type path compression means 4 immediately completes the process. In the step S401, when the number of arcs in the input direction is one and the number of arcs in the output direction is two or more, the path of the graph information is a branch type path, the branch type path compression means 4 accumulates, in the step S402, the additional delay time of the noticed node, the delay time of the arc in the input direction, the delay time of the element of the arc in the input direction and the delay time of the respective arcs in the output direction to thus obtain the delay times of the respective arcs in the output direction.

Subsequently, the branch type path compression means 4 changes the input side connection of nodes in the output direction to the input side node of the arc in the input direction from the noticed node in the step S403 and deletes the noticed node and the node in the input direction in the step S404 to finish the process. As a result, the path information is compressed in a manner illustrated in FIG.

Figure 11:
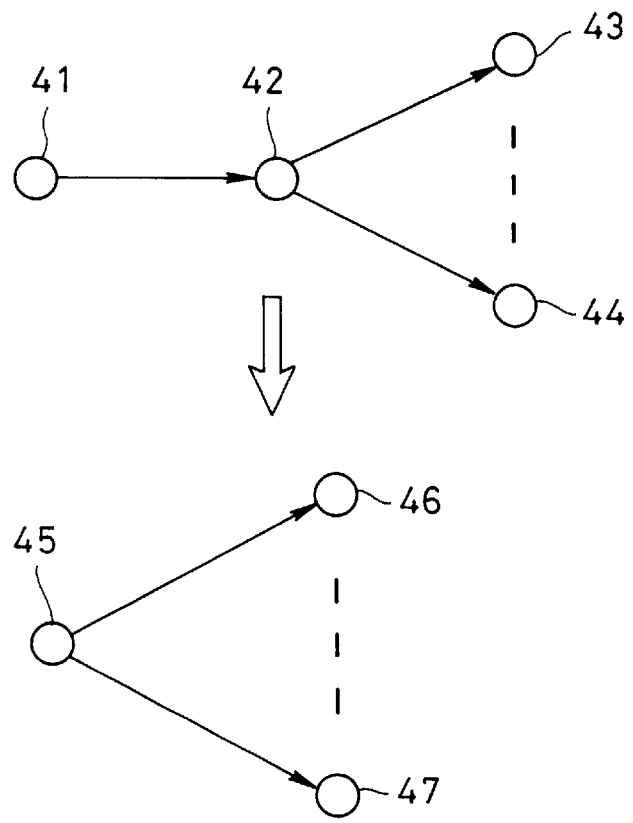
FIG. 11 is an explanatory view for explaining the compression of a path by the branch type path compression means shown in FIG. 1.

FIG. 11 is a diagram for explaining the compression of a path by the branch type path compression means 4. Referring to FIG. 11, a node 42 is deleted. A node 41 is changed to a node 45 and a node 43 is changed to a node 46. A node 44 is changed to a node 47. The weight of an arc from the node 41 to the node 42 is added to the weight of an arc from the node 42 to the node 43 to have the weight of an arc from the node 45 to the node 46. The weight of an arc from the node 41 to the node 42 is added to the weight of an arc from the node 42 to the node 44 to have the weight of an arc from the node 45 to the node 47. Nodes located between the node 43 and the node 44 are also compressed in the same manner as above.

When a control returns to the compression control means 7 from the branch type path compression means 4, the compression control means 7 pays attention to the next node in the step S113, and returns the control to the step S111 to repeatedly carry out the steps S111 to S113.

In the step S111, when the compression control means 7 decides that all the nodes are completely processed, the compression control means 7 notices the first node in the step S114 to decide whether or not all the nodes are processed in the step S115. When all the nodes are not completely processed, the compression control means 7 calls the multi-path type path compression means 5 in the step S116.

The multi-path type path compression means 5 decides whether or not there exist the same combinations of input side nodes with output side nodes for all the arcs in the input direction of the noticed node in the step S501. When there are no same combinations of input side nodes with output side nodes, the path of graph information is not a multi-path type path, the multi-path type path compression means 5 immediately finishes the process. In the step S501, when there exist the same combinations of input side nodes with output side nodes in the arcs, the path of the graph information is regarded as a multi-path type path, so that the multi-path type path compression means 5 deletes all other arcs except an arc the sum of its delay time and the delay time of the element of which is maximum among the arcs to be processed in the step S502 to finish the process. Consequently, the path information is compressed in a manner as shown in FIG. 12.

Figure 12:
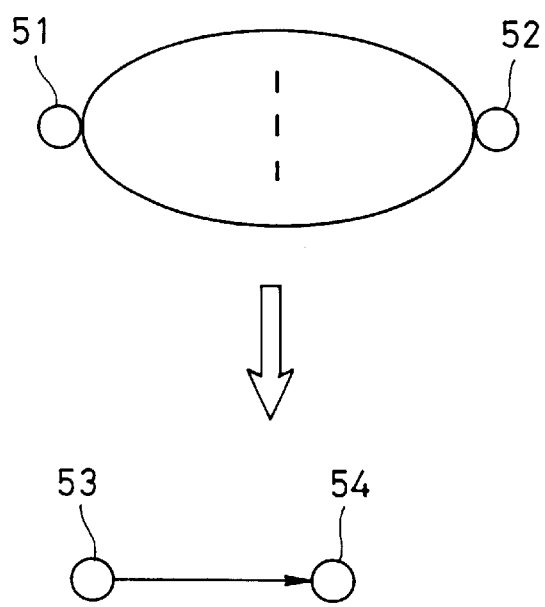
FIG. 12 is an explanatory view for explaining the compression of a path by the multi-path type path compression means shown in FIG. 1.

FIG. 12 is an explanatory diagram for explaining the compression of a path information by the multi-path type path compression means 5. A node 51 is changed to a node 53 and a node 52 is changed to a node 54. The maximum weight of all the weights of arcs from the node 51 to the node 52 is regarded as the weight of an arc from the node 53 to the node 54.

When a control returns to the compression control means 7 from the multi-path type path compression means 5, the compression control means 7 notices the next node in the step S117 and returns the control to the step S115 to repeat the steps S115 to S117.

In the step S115, when it is decided that all the nodes are processed, the compression control means 7 pays attention to the first node in the step S118 to judge whether or not all the nodes are processed in the step S119. When all the nodes are not completely processed, the compression control means 7 calls the cross type path compression means 6 in the step S120.

The cross type path compression means 6 decides whether or not the number of arcs in the input direction of the noticed node is two or more and the number of arcs in the output direction of the noticed node is two or more in the step S601. When the number of arcs in the input direction is not two or more and the number of arcs in the output direction is not two or more, the path of the graph information is not regarded as a cross type path, the cross type path compression means 6 rapidly completes the process. In the step S601, when the number of arcs respectively in the input and output directions of the noticed node is two or more, the path of the graph information is regarded as a cross type path, hence, the cross type path compression means 6 pays attention to one of the combinations of arcs in the input direction and in the output direction of the noticed node in the step S602 to decide whether or not all the combinations of arcs are processed in the step S603. When all the combinations of arcs are not completely processed, the cross type path compression means 6 forms arcs for connecting the input side nodes of the arcs in the input direction to the output side nodes of the arcs in the output direction in the step S604. Then, the cross type path compression means 6 accumulates the additional delay time of the noticed node, the delay time of the arcs in the input direction, the delay time of the elements of the arcs in the input direction and the delay time of the arcs in the output direction to have the delay time of new arcs in the step S605.

In the next place, the cross type path compression means 6 sets the delay time of the elements of the arcs in the output direction to the delay time of the elements of the new arcs in the step S606. Then, the cross type path compression means 6 pays attention to the combination of arcs in different input direction and output direction in the step S607 and returns its control to the step S603 to repeatedly perform the steps S603 to S607. In the step S603, when it is decided that all the combinations of arcs are processed, the cross type path compression means 6 deletes the arcs which have been already processed and the noticed node in the step S608 to complete the process. As a result, the compression of a path information is carried out as illustrated in FIG. 13.

FIG. 13 is an explanatory diagram for explaining the compression of a path information by the cross type path compression means 6. A node 64 is deleted. A node 61 is changed to a node 68, a node 62 is changed to a node 69, a node 63 is changed to a node 70, a node 65 is changed to a node 71, a node 66 is changed to a node 72 and a node 67 is changed to a node 73. The weight of an arc from the node 61 to the node 64 is added to the weight of an arc from the node 64 to the node 65 to have the weight of an arc from the node 68 to the node 71. The weight of an arc from the node 61 to the node 64 is added to the weight of an arc from the node 64 to the node 66 to have the weight of an arc from the node 68 to the node 72. The weight of an arc from the node 63 to the node 64 is similarly added to the weight of an arc from the node 64 to the node 67 to have the weight of an arc from the node 70 to the node 73.

When a control is returned to the compression control means 7 from the cross type path compression means 6, the compression control means 7 pays attention to the next node in the step S121 and returns the control to the step S119 to repeat the steps S119 to S121.

In the step S119, when it is decided that all the nodes are processed, the compression control means 7 returns its control to the step S101 to repeatedly carry out the steps S101 to S121. Then, in the step S101, when it is decided that the compression effect cannot be attained even when any of the five path compression means including the linear type path compression means 2, the entry type path compression means 3, the branch type path compression means 4, the multi-path type path compression means 5 and the cross type path compression means 6 is applied to the path of the graph information, the compression control means 7 completes the process.

As described above, whatever graph information is stored in the graph information storing means 1, the linear type path compression means 2, the entry type path compression means 3, the branch type path compression means 4, the multi-path type path compression means 5 and the cross type path compression means 6 are all applied to the graph information under the control of the compression control means 7, so that the graph information stored in the graph information storing means 1 becomes graph information of a graph composed of nodes having only start points and end points and arcs for connecting them as in the forms after compression illustrated in FIGS. 9 to 13.

The above-mentioned fact can be demonstrated in accordance with the following reduction and absurdum.

It is assumed that there remain nodes other than the start points and the end points or arcs for connecting them together in the graph information stored in the graph information storing means 1 even when the path compression system of the present invention is applied to the graph information. In this case, one of the nodes other than the start points and the end points has an arc between any start point and itself. Assuming that the node except the start points and the end points and having the arc with one start point is n, and one of the nodes having the arc with the node n is a, the following classification is obtained.

(1) In case there exists one arc from the node a to the node n in the graph information:

(1-1) In case there exists one arc extending from the node n in the direction opposite to that of the node a and one arc extending in the same direction of that of the node a in the graph information;

the graph information is to be compressed by the linear type path compression means 2, so that it is not the graph information which is subjected to the path compression system according to the present invention.

(1-2) In case the graph information includes two or more arcs extending in the direction opposite to that of the node a from the node n and one arc extending in the same direction as that of the node a;

the graph information is to be compressed by the branch type path compression means 4, so that it is not the graph information obtained after the path compression system of the present invention is applied thereto.

(1-3) In case the graph information includes one arc extending to the direction opposite to that of the node a from the node n and two arcs or more extending in the same direction as that of the node a;

the path of graph information is to be compressed by the entry type path compression means 3, so that it is not the graph information obtained after the path compression system of the present invention is applied thereto.

(1-4) In case the graph information includes two or more arcs extending in the direction opposite to that of the node a from the node n and two or more arcs extending in the same direction as that of the node a;

the graph information must be compressed by the cross type path compression means 6, so that it is not the graph information to be obtained after the path compression system of the present invention is applied thereto.

(2) In case the graph information includes two or more arcs from the node a to the node n:

the graph information must be compressed by the multi-path type path compression means 5, so that it is not the graph information to be obtained after the path compression system of the present invention is applied thereto.

In the above-described first embodiment, although it is decided whether or not a path is a linear type path, an entry type path, a branch type path, a multi-path type path and a cross type path respectively in the linear type path compression means 2, the entry type path compression means 3, the branch type path compression means 4, the multi-path type path compression means 5 and the cross type path compression means 6 and the compression control means 7 controls all the path compression means to be applied respectively to the path, needless to say, the present invention is not limited thereto, and the compression control means 7 may decide whether or not the path is the linear type path, the entry type path, the branch type path, the multi-path type path and the cross type path and may apply selectively the linear type path compression means 2, the entry type path compression means 3, the branch type path compression means 4, the multi-path type path compression means 5 and the cross type path compression means 6 to the path.

An explanation will be now given to a second embodiment of the present invention by referring to the accompanying drawings.

Turning now to FIG. 17, a path compression system according to a second embodiment of the present invention has a main part comprising a data processor 11, an input device 12 including a keyboard, a mouse, etc., a storage device 13 including a memory, a magnetic disk device, etc., an output device 14 including a display or the like, and a recording medium 15 in which a path compression program is recorded. The recording medium 15 may include a magnetic disk, a semiconductor memory and other recording media.

The path compression program is read by the data processor 11 from the recording medium 15 and the path compression program controls the operation of the data processor 11 (including the storage device 13) as a graph information storing means 1, a linear type path compression means 2, an entry type path compression means 3, a branch type path compression means 4, a multi-path type path compression means 5, a cross type path compression means 6 and a compression control means 7. The operation of the data processor 11 (including the storage device 13) under the control of the path compression program is the same as that in the case of the path compression system according to the first embodiment shown in FIGS. 1 to 16, and therefore, the detailed explanation thereof will be omitted.

The effect of the present invention resides in that whatever graph information is stored in the graph information storing means, the path of the graph information can be completely compressed, because the linear type path compression means, the entry type path compression means, the branch type path compression means, the multi-path type path compression means and the cross type path compression means are entirely or selectively applied to the graph information under the control of the compression control means so that the graph information stored in the graph information storing means is changed to graph information only composed of nodes having the start points and end points and arcs for connecting them together.

What is claimed is:

1. A path compression system comprising:
   a graph information storage device that stores graph information having a plurality of nodes and a plurality of arcs;
   a linear type path compression device that compresses linear type path information in said graph information;
   an entry type path compression device that compresses entry type path information in said graph information;
   a branch type path compression device that compresses branch type path information in said graph information;
   a multi-path type path compression device that compresses multi-path type path information in said graph information;
   a cross type path compression device that compresses cross type path information in said graph information; and
   a compression control device that entirely applies said linear type path compression device, said entry type path compression device, said branch type path compression device, said multi-path type path compression device and said cross type path compression device to the graph information stored in said graph information storage device to respectively compress said linear type path information, said entry type path information, said branch type path information, said multi-path path information and said cross type path information by removal of at least one of said nodes or at least one of said arcs.

2. The path compression system according to claim 1, wherein said compression control device comprises:
   a device that decides whether or not there is no compression effect even when any of said linear type path compression device, said entry type path compression device, said branch type path compression device, said multi-path type path compression device and said cross type path compression device are applied to one of said nodes noticed by said compression control device, said noticed node coupled to one of said arcs in an input direction and another of said arcs in an output direction in said graph information; and
   a device that calls respectively said linear type path compression device, said entry path type compression device, said branch type path compression device, said multi-path type path compression device and said cross type path compression device for said noticed node when the compression effect is attained and performing respective compression control processes therefor; and
   a device that makes all of said nodes as said noticed node.

3. The path compression system according to claim 2, wherein said linear type path compression device comprises:
   a device that decides whether or not a number of said arcs in the input direction of said noticed node is one and a number of said arcs in the output direction is one;
   a device that accumulates the additional delay time of said noticed node, the delay time of the arc in said output direction, the delay time of the element of the arc in said input direction and the newly delay time of the arc in said input direction to have the delay time of the arc in said input direction, when the decided result is "YES;"
   a device that regards the delay time of the element of the arc in said output direction as the delay time of the element of the arc in said input direction;
   a device that changes the output side connection of said arc in said input direction to the output side node of said arc in said output direction from said noticed node; and
   a device that deletes said noticed node and the arc in said output direction.

4. The path compression system according to claim 2, wherein said entry type path compression device comprises:
   a device that decides whether or not a number of said arcs in the input direction of said noticed node is two or more and a number of said arcs in the output direction is one;
   a device that accumulates the additional delay time of said noticed node, the delay time of the arc in said output direction, the delay time of the elements of the arcs in said input direction of said noticed node and the delay time of the respective arcs in said input direction to have the delay times of the elements of the respective arcs in said input direction when the decided result is "YES;"
   a device that regards the delay time of the element of the arc in said output direction as the delay time of the elements of the respective arcs in said input direction;
   a device that changes the output side connections of respective nodes in said input direction to an output side node of the arc in said output direction from said noticed node; and
   a device that deletes said noticed node and the arc in said output direction.

5. The path compression system according to claim 2, wherein said branch type path compression device comprises:
   a device that decides whether or not the number of said arcs in the input direction of said noticed node is one and whether or not the number of said arcs in the output direction is two or more;
   a device that accumulates the additional delay time of said noticed node, the delay time of the arc in said input direction, the delay time of the element of the arc in said input direction and the delay time of the respective arcs in said output direction to have the delay times of the respective arcs in the output direction when the decided result is "YES;"
   a device that changes the input side connections of said nodes in said output direction to the input side node of the arc in said input direction from said noticed node; and
   a device that deletes said noticed node and the node in said input direction.

6. The path compression system according to claim 2, wherein said multi-path type path compression device comprises:
   a device that decides whether or not there exist the same combinations of input side nodes and output side nodes in all arcs in the input direction of said noticed node; and
   a device that deletes all other arcs except one of said arcs, the sum of its delay time and the delay time of the element of which is maximum among arcs to be processed when the decided result is "YES."

7. The path compression system according to claim 2, wherein said cross type path compression device comprises:
   a device that decides whether or not a number of said arcs in the input direction of said noticed node is two or more and a number of said arcs in the output direction is two;

a device that pays attention respectively to combinations of the arcs in said input direction and in the output direction and forming arcs for connecting the input side nodes of the arcs in said input direction to the output side nodes of the arcs in said output direction when the decided result is "YES;"

a device that accumulates the additional delay time of said noticed node, the delay time of the arcs in said input direction, the delay time of the elements of the arcs in said input direction and the delay time of the arcs in said output direction to have the delay time of new arcs; and a device that deletes the processed arcs and said noticed node.

8. The path compression system of claim 1, further comprising:

an input device coupled to transmit an input to a data processor;

an output device coupled to receive an output from said data processor; and a recording medium that records and stores a path compression program, wherein said data processor comprises said linear type path compression device, said entry type path compression device, said branch type path compression device, said multi-path type path compression device, said cross type path compression device and said compression control device.

9. A path compression system comprising:

a graph information storage device that stores graph information that includes a plurality of nodes and a plurality of arcs;

a linear type path compression device that compresses linear type path information in said graph information;

an entry type path compression device that compresses entry type path information in said graph information;

a branch type path compression device that compresses branch type path information in said graph information;

a multi-path type path compression device that compresses multi-path type path information in said graph information;

a cross type path compression device that compresses cross type path information in said graph information; and a compression control device that selects the path information to be compressed, by removal of at least one of said nodes or at least one of said arcs, from said linear type path, said entry type path, said branch type path, said multi-path type path and said cross type path based on the graph information stored in said graph information storage device and selectively applying said linear type path compression device, said entry type path compression device, said branch type path compression device, said multi-path type path compression device and said cross type path compression device.

10. The path compression system of claim 9, further comprising:

an input device coupled to transmit an input to a data processor;

an output device coupled to receive an output from said data processor; and a recording medium that records and stores a path compression program, wherein said data processor comprises said linear type path compression device, said entry type path compression device, said branch type path compression device, said multi-path type path compression device, said cross type path compression device and said compression control device.

11. A path compression method comprising:

a graph information storing step for storing graph information that comprises a plurality of arcs and a plurality of nodes;

a linear type path compression step for compressing linear type path information in said graph information;

an entry type path compression step for compressing entry type path information in said graph information;

a branch type path compression step for compressing branch type path information in said graph information;

a multi-path type path compression step for compressing multi-path type path information in said graph information;

a cross type path compression step for compressing cross type path information in said graph information; and a compression control step for entirely applying said linear type path compression step, said entry type path compression step, said branch type path compression step, said multi-path type path compression step and said cross type path compression step to the graph information stored in said graph information storing step to compress the path information by removal of at least one of said nodes or at least one of said arcs.

12. The path compression method according to claim 11, wherein said compression control step comprises:

a step for deciding whether or not there is no compression effect even when any of said linear type path compression step, said entry type path compression step, said branch type path compression step, said multi-path type path compression step and said cross type path compression step are applied to a node noticed in said compression control step, said noticed node coupled to an arc in an input direction and an arc in an output direction in said graph information; and a step for calling respectively said linear type path compression step, said entry path type compression step, said branch type path compression step, said multi-path type path compression step and said cross type path compression step for said noticed node when the compression effect is attained and performing respective compression control processes therefor; and a step for making all of said nodes as said noticed node.

13. The path compression method according to claim 12, wherein said linear type path compression step comprises:

a step for deciding whether or not a number of said arcs in the input direction of said noticed node is one and whether or not a number of said arcs in the output direction is one;

a step for accumulating the additional delay time of said noticed node, the delay time of the arc in said output direction, the delay time of the element of the arc in said input direction and the delay time of the arc in said input direction to have the newly delay time of the arc in said input direction when the decided result is "YES;"

a step for regarding the delay time of the element of the arc in said output direction as the delay time of the element of the arc in said input direction;

a step for changing the output side connection of said arc in said input direction to the output side node of said arc in said output direction from said noticed node; and a step for deleting said noticed node and the arc in said output direction.

14. The path compression method according to claim 12, wherein said entry type path compression step comprises:

a step for deciding whether or not a number of said arcs in the input direction of said noticed node is two or more and a number of said arcs in the output direction is one;

a step for accumulating the additional delay time of said noticed node, the delay time of the arc in said output direction, the delay time of the elements of the arcs in said input direction of said noticed node and the delay time of the respective arcs in said input direction to have the delay times of the elements of the respective arcs in said input direction when the decided result is "YES;"

a step for regarding the delay time of the element of the arc in said output direction as the delay time of the elements of the respective arcs in said input direction;

a step for changing the output side connections of respective nodes in said input direction to an output side node of the arc in said output direction from said noticed node; and a step for deleting said noticed node and the arc in said output direction.

15. The path compression method according to claim 12, wherein said branch type path compression step comprises:

a step for deciding whether or not a number of said arcs in the input direction of said noticed node is one and a number of said arcs in the output direction is two or more;

a step for accumulating the additional delay time of said noticed node, the delay time of the arc in said input direction, the delay time of the element of the arc in said input direction and the delay time of the respective arcs in said output direction to have the delay times of the respective arcs in the output direction when the decided result is "YES;"

a step for changing the input side connections of nodes in said output direction to the input side node of the arc in said input direction from said noticed node; and a step for deleting said noticed node and the node in said input direction.

16. The path compression method according to claim 12, wherein said multi-path type path compression step comprises:

a step for deciding whether or not there exist the same combinations of input side nodes and output side nodes in all arcs in the input direction of said noticed node; and a step for deleting all other said arcs except an arc the sum of its delay time and the delay time of the element of which is maximum among the arcs to be processed when the decided result is "YES."

17. The path compression method according to claim 12, wherein said cross type path compression step comprises:

a step for deciding whether or not a number of arcs in the input direction of said noticed node is two or more and a number of arcs in the output direction is two;

a step for paying attention respectively to combinations of the arcs in said input direction and in the output direction and forming arcs for connecting the input side nodes of the arcs in said input direction to said output side nodes of the arcs in said output direction when the decided result is "YES;"

a step for accumulating the additional delay time of said noticed node, the delay time of the arcs in said input direction, the delay time of the elements of the arcs in said input direction and the delay time of the arcs in said output direction to have the delay time of new arcs; and a step for deleting the processed arcs and said noticed node.

18. The path compression method of claim 11, further comprising:

receiving and transmitting an input to a data processor;

outputting an output from said data processor to an output device; and recording and storing a path compression program in a recording medium, wherein said data processor comprises said linear type path compression device, said entry type path compression device, said branch type path compression device, said multi-path type path compression device, said cross type path compression device and said compression control device.

19. A path compression method comprising:

a graph information storing step for storing graph information having a plurality of nodes and a plurality of arcs;

a linear type path compression step for compressing linear type path information in said graph information;

an entry type path compression step for compressing entry type path information in said graph information;

a branch type path compression step for compressing branch type path information in said graph information;

a multi-path type path compression step for compressing multi-path type path information in said graph information;

a cross type path compression step for compressing cross type path information in said graph information; and a compression control step for selecting the path information to be compressed, by removal of at least one of said nodes or at least one of said arcs, from said linear type path, said entry type path, said branch type path, said multi-path type path and said cross type path based on the graph information stored in said graph information storing step, selectively applying said linear type path compression step, said entry type path compression step, said branch type path compression step, said multi-path type path compression step and said cross type path compression step.

20. The path compression method of claim 19, further comprising:

receiving and transmitting an input to a data processor;

outputting an output from said data processor to an output device; and recording and storing a path compression program in a recording medium, wherein said data processor comprises said linear type path compression device, said entry type path compression device, said branch type path compression device, said multi-path type path compression device, said cross type path compression device and said compression control device.

* * * * *